US012667965B2

(12) United States Patent
Gao et al.

(10) Patent No.: US 12,667,965 B2
(45) Date of Patent: Jun. 30, 2026

(54) GANTRY PLATFORM KINEMATICS MODELING METHOD CONSIDERING PARALLELISM AND PERPENDICULARITY ERRORS

(71) Applicant: GUANGDONG UNIVERSITY OF TECHNOLOGY, Guangzhou (CN)

(72) Inventors: Jian Gao, Guangzhou (CN); Fuyuan Feng, Guangzhou (CN); Lanyu Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/298,083

(22) Filed: Aug. 12, 2025

(65) Prior Publication Data

US 2025/0367825 A1      Dec. 4, 2025

Related U.S. Application Data

(63) Continuation of application No. PCT/CN2024/126467, filed on Oct. 22, 2024.

(30) Foreign Application Priority Data

Feb. 7, 2024    (CN) .......................... 202410172531.2

(51) Int. Cl.
| | |
|---|---|
| *B25J 9/16* | (2006.01) |
| *B25J 9/02* | (2006.01) |
| *B25J 13/08* | (2006.01) |

(52) U.S. Cl.
CPC ............. B25J 9/1653 (2013.01); B25J 9/026 (2013.01); B25J 9/1605 (2013.01); B25J 13/088 (2013.01);
(Continued)

(58) Field of Classification Search
CPC ........ B25J 13/088; B25J 9/026; B25J 9/1605; B25J 9/1623; B25J 9/1653; B25J 9/1671; G05B 2219/40293; G05B 2219/40519
See application file for complete search history.

(56) References Cited

U.S. PATENT DOCUMENTS

| | | | | |
|---|---|---|---|---|
| 8,210,418 | B1 * | 7/2012 | Landoll .............. | B23K 37/0452 |
| | | | | 228/43 |
| 11,273,602 | B2 * | 3/2022 | Wiktor ................... | B25J 9/0003 |
| 2017/0351239 | A1 * | 12/2017 | Wilder ................... | B25J 9/1687 |

FOREIGN PATENT DOCUMENTS

| | | |
|---|---|---|
| CN | 109657282 A | 4/2019 |
| CN | 109746915 A | 5/2019 |

(Continued)

OTHER PUBLICATIONS

Internation Search Report of PCT/CN2024/126467, Mailed Jan. 21, 2025.

(Continued)

*Primary Examiner* — Wade Miles
*Assistant Examiner* — Zachary Joseph Wallace

(57) ABSTRACT

The invention relates to the technical field of intelligent control, and particularly to a gantry platform kinematics modeling method considering parallelism and perpendicularity errors, which is applied to a gantry platform device. The gantry platform device comprises a crossbeam, a first guide rail and a second guide rail, one end of the crossbeam is in sliding fit with the first guide rail, and the other end of the crossbeam is in sliding fit with the second guide rail; the first guide rail is provided with a first longitudinal motor, and the second guide rail is provided with a second longitudinal motor; and the crossbeam is provided with a transverse motor configured to drive the gantry platform to move along the crossbeam. The method comprises: establishing a two-dimensional coordinate system; constructing a forward kine-
(Continued)

matics solution model; and constructing an inverse kinematics solution model.

7 Claims, 6 Drawing Sheets

(52) U.S. Cl.
CPC ... *B25J 9/1671* (2013.01); *G05B 2219/40293* (2013.01); *G05B 2219/40519* (2013.01)

(56) References Cited

FOREIGN PATENT DOCUMENTS

| | | | |
|---|---|---|---|
| CN | 111026038 | A | 4/2020 |
| CN | 112008492 | A | 12/2020 |
| CN | 114473631 | A | 5/2022 |
| CN | 115284072 | A | 11/2022 |
| CN | 115390512 | B | 5/2023 |
| CN | 116803604 | A | 9/2023 |
| JP | 2018104185 | A | 7/2018 |
| KR | 20190041193 | A | 4/2019 |

OTHER PUBLICATIONS

Liu Baojun et al., "The Research of Geometric Error Model and Compensation of Gantry Machine Tools", Combined machine tool and automatic machining technology, No. 6, Jun. 20, 2012, entire document.

Jiang Xin, "Study On the Measurement and Compensation of Form and Position Errors for the Large Gantry Type Machine Tool", Wanfang Master's Thesis, Dec. 31, 2015, entire Document.

* cited by examiner

GANTRY PLATFORM KINEMATICS MODELING METHOD CONSIDERING PARALLELISM AND PERPENDICULARITY ERRORS

CROSS-REFERENCE TO RELATED APPLICATIONS

This application is a continuation of International Patent Application No. PCT/CN2024/126467 with a filing date of Oct. 22, 2024, designating the United States, now pending, and further claims priority to Chinese Patent Application No. 202410172531.2 with a filing date of Feb. 7, 2024. The content of the aforementioned applications, including any intervening amendments thereto, are incorporated herein by reference.

TECHNICAL FIELD

The present invention relates to the technical field of intelligent control, and particularly to a gantry platform kinematics modeling method considering parallelism and perpendicularity errors.

BACKGROUND OF THE PRESENT INVENTION

With the development of high-end manufacturing in China, and considering the advantages of gantry dual-drive structures, such as long travel and high speed, a vast majority of XY dual-axis planar motion platforms for high-end manufacturing equipment adopt a gantry dual-drive structure, that is, both ends of a crossbeam are driven by motors. Coupling between two motors is inevitable in redundant drive. How to achieve highly coordinated movement between the two motors is a core challenge in ensuring the positioning precision at the end of the motion platform.

As shown in FIG. 1, a parallelism error between two guide rails and insufficient perpendicularity precision between the crossbeam and the guide rails will lead to severe forced deformation for the crossbeam and its connecting parts when the motors Y1 and Y2 perform pure position-synchronized movements. This does not only fail to ensure high-precision positioning at the platform's end, but also increases crossbeam vibration, energy consumption, and even damage to structural parts.

There are methods for improving the positioning precision of gantry platforms in prior art, such as a flexible gantry dual-drive system and joint electromechanical decoupling motion control method thereof disclosed in CN115390512B, in which motors Y1 and Y2 are connected to the crossbeam through a flexible supporting device, resulting in a complex structure and control method for the gantry dual-drive system. Another example is a gantry platform calibration method and gantry platform disclosed in CN116803604A, which calculates an offset angle and an offset amount by measuring coordinate of a calibration point, and determines a motion compensation amount for the gantry platform based on the calculated offset values. However, this technology in the patent fails to account for parallelism error between the two guide rails and insufficient perpendicularity precision between the crossbeam and the guide rails, resulting in low precision of error measurement and difficulty in achieving more precise drive control.

SUMMARY OF THE PRESENT INVENTION

One objective of the invention is to propose a gantry platform kinematics modeling method considering parallelism and perpendicularity errors which is suitable for actual kinematics path planning of the gantry platform, and has high positioning precision.

A further objective of the invention is to propose a gantry platform control method applied to the aforementioned kinematics modeling method, which enables the gantry platform to achieve higher positioning precision and prevent vibration of the crossbeam.

A still further objective of the invention is to propose a gantry platform device, which is simple in structure, high in positioning precision and further capable of avoiding forced deformation of the crossbeam and the connecting pieces of the crossbeam in the moving process.

In order to achieve these objectives, the invention adopts the following technical solutions.

A gantry platform kinematics modeling method considering parallelism and perpendicularity errors applied to a gantry platform device which comprises a crossbeam, a first guide rail and a second guide rail, wherein one end of the crossbeam is in sliding fit with the first guide rail, and the other end of the crossbeam is in sliding fit with the second guide rail; the first guide rail is provided with a first longitudinal motor, the second guide rail is provided with a second longitudinal motor, and the first longitudinal motor and the second longitudinal motor are respectively connected to two ends of the crossbeam; and the crossbeam is provided with a transverse motor configured to drive the gantry platform to move along the crossbeam.

The method comprises the following steps:

(1) establishing a two-dimensional coordinate system taking the first guide rail as a reference guide rail and an initial position of the first longitudinal motor as an origin to establish a two-dimensional coordinate system $O_0$ in a plane at which the first guide rail and the second guide rail are located, wherein in the coordinate system, a coordinate of the first longitudinal motor after movement is Y1' $(0, y_1)$, a coordinate of the second longitudinal motor after movement is Y2' $(x_2, y_2)$, and a position coordinate of the gantry platform after movement is $(x, y)$; and a length of the crossbeam is 1, a parallelism error between the first guide rail and the second guide rail is $\alpha$, and a perpendicularity error between the crossbeam and the first guide rail at the initial position of the first motor is $\beta_0$;

(2) constructing a forward kinematics solution model it is given that moved displacements of the first longitudinal motor, the second longitudinal motor and the transverse motor are $y_{e1}$, $y_{e2}$, $x_e$ and an initial offset of the transverse motor is $x_{z0}$, solving displacements $x_r$, $y_r$ of the gantry platform as follows:

$$\begin{cases} x_r & = x_{e1} \cos \beta_0 \\ y_r & = \dfrac{x y_2 - x y_1 + x_2 y_1}{x_2 - x_{z0} \beta_0} \end{cases} ; \qquad \text{equation } (1\text{-}4)$$

and (3) constructing an inverse kinematics solution model it is given that the displacements of the gantry platform are $x_r$, $y_r$, solving required displacements $y_{e1}$, $y_{e2}$, $x_e$ for the first longitudinal motor, the second longitudinal motor and the transverse motor to move:

$$\begin{cases} y_{e1} & = y_1 \\ y_{e2} & = \dfrac{y_2 - 1\,\beta_0}{\cos a} \\ x_e & = \dfrac{x_r}{\cos \beta} \end{cases}, \qquad \text{equation } (1\text{–}9)$$

wherein $\beta$ is a perpendicularity error after movement.

Further, in the step (2), the step of constructing the forward kinematics solution model is as follows:

it is given that the moved displacements of the first longitudinal motor, the second longitudinal motor and the transverse motor are $y_{e1}$, $y_{e2}$, $x_e$ and the initial offset of the transverse motor is $x_{z0}$, coordinate values of each point are as follows:

$$x_0 = x_{z0},\ y_0 = x_{z0}\,\beta_0,\ y_1 = y_{e1} \qquad \text{equation } (1\text{–}1)$$

$$x_2 = 1\cos\beta_0 + y_{e2}\,a,\ y_2 = 1\,\beta_0 + y_{e2}\cos a;$$

the perpendicularity error $\beta$ after movement is:

$$\beta = \frac{y_2 - y_1}{x_2} = \frac{1\,\beta_0 + y_{e2}\cos a - y_{e1}}{1\cos\beta_0 + y_{e2}\,a}; \qquad \text{equation } (1\text{–}2)$$

an end position $x$ after movement is:

$$X = X_{e1}\cos\beta_0 + x_{z0}; \qquad \text{equation } (1\text{–}3)$$

then a forward kinematics solution value $x_r$, $y_r$ is:

$$\begin{cases} x_r & = x_{e1}\cos\beta_0 \\ y_r & = \dfrac{xy_2 - xy_1 + x_2 y_1}{x_2 - x_{z0}\beta_0} \end{cases}. \qquad \text{equation } (1\text{–}4)$$

Further, in the step (3), the step of constructing the inverse kinematics solution model is as follows:

it is given that the displacements of the gantry platform are $x_r$, $y_r$, values of $x$, $y$, $x_2$ are:

$$x = x_{z0} + x_r,\ y = x_{z0}\,\beta_0 + y_r \qquad \text{equation } (1\text{–}5)$$

$$x_2 = 1\cos\beta_0 + y_r\,a;$$

based on a geometrical relationship, an equation set is obtained:

$$\begin{cases} \dfrac{-x}{x - x_2} & = \dfrac{y_1 - y}{y - y_2} \\ x_2^2 + (y_2 - y_1)^2 & = 1^2 \end{cases}; \qquad \text{equation } (1\text{–}6)$$

values of the coordinate $(y_1,\ y_2)$ are solved as follows:

$$\begin{cases} y_1 & -\dfrac{x_2 y - \dfrac{x\left(x_2 y - x\sqrt{(1+x_2)(1-x_2)}\right) + x_2\sqrt{(1+x_2)(1-x_2)}}{x_2}}{x - x_2} \\ y_2 & = \dfrac{x_2 y - x\sqrt{(1+x_2)(1-x_2)} + x_2\sqrt{(1+x_2)(1-x_2)}}{x_2} \end{cases}; \qquad \text{equation } (1\text{–}7)$$

the perpendicularity error $\beta$ after movement is:

$$\beta = \frac{y_2 - y_1}{x_2}; \qquad \text{equation } (1\text{–}8)$$

the required displacements $y_{e1}$, $y_{e2}$, $x_e$ for the first longitudinal motor, the second longitudinal motor and the transverse motor to move are:

$$\begin{cases} y_{e1} & = y_1 \\ y_{e2} & = \dfrac{y_2 - 1\,\beta_0}{\cos a} \\ x_e & = \dfrac{x_r}{\cos \beta} \end{cases}. \qquad \text{equation } (1\text{–}9)$$

Further, in the equation (1-5), the value of $x_2$ is an estimated value, and $y_{e2} \sim y_r$ is set.

A gantry platform control method, wherein the method utilizes the aforementioned gantry platform kinematics modeling method considering parallelism and perpendicularity errors.

The gantry platform control method comprises the following steps:

acquiring expected displacements $x_r$, $y_r$ of the gantry platform after movement;

obtaining the required displacements $x_e$, $y_{e1}$, $y_{e2}$ for the transverse motor, the first longitudinal motor and the second longitudinal motor to move by using the inverse kinematics solution mode;

controlling the movement of the first longitudinal motor, the second longitudinal motor and the transverse motor;

acquiring actual displacements $x_{t1}$, $y_{t1}$, $y_{t2}$ of the transverse motor, the first longitudinal motor and the second longitudinal motor;

obtaining an actual position $(x, y)$ of the gantry platform after movement by using the forward kinematics solution model; and compensating for a deviation between an expected position $(x, y)$ and the actual position $(x, y)$ of the gantry platform after movement.

Further, the actual displacements $x_{t1}$, $y_{t1}$, $y_{t2}$ of the transverse motor, the first longitudinal motor and the second longitudinal motor are acquired by using a displacement sensor.

Further, the parallelism error a and the perpendicularity error $\beta_0$ are obtained by means of measurement.

A gantry platform device applied to the aforementioned gantry platform control method, wherein the gantry platform device comprises a crossbeam, a first guide rail and a second guide rail, one end of the crossbeam is in sliding fit with the first guide rail, and the other end of the crossbeam is in sliding fit with the second guide rail; the first guide rail is provided with a first longitudinal motor, the second guide rail is provided with a second longitudinal motor, and the first longitudinal motor and the second longitudinal motor are respectively connected to two ends of the crossbeam; and the crossbeam is provided with a transverse motor configured to drive the gantry platform to move along the crossbeam.

The gantry platform device further comprises a controller and a displacement sensor, the displacement sensor is configured to sense the displacements of the transverse motor, the first longitudinal motor and the second longitudinal motor, and send displacement data to the controller.

The controller stores the forward kinematics solution model and the inverse kinematics solution model, the controller is configured to obtain the required displacements $y_{e1}$, $y_{e2}$, $x_e$ for the transverse motor, the first longitudinal motor and the second longitudinal motor to move based on the expected displacement of the gantry platform after movement and the inverse kinematics solution model, send a movement instruction to the transverse motor, the first longitudinal motor and the second longitudinal motor, and obtain a compensation deviation.

The technical solution provided by the invention includes the following beneficial effects.

The aforementioned kinematics modeling method takes into account the parallelism error between the two guide rails as well as insufficient perpendicularity precision between the crossbeam and the guide rails. By establishing forward and inverse kinematics solution models, a simple structure is provided for the gantry platform device while achieving more precise positioning for the gantry platform and a better applicability to actual kinematic planning path of the gantry platform. This not only improves the positioning precision of the gantry platform but also addresses issues of forced deformation and vibration of the crossbeam caused by the parallelism errors between the guide rails and the perpendicularity errors between the crossbeam and the guide rails, as well as insufficient positioning precision of the gantry platform.

Figure 1:
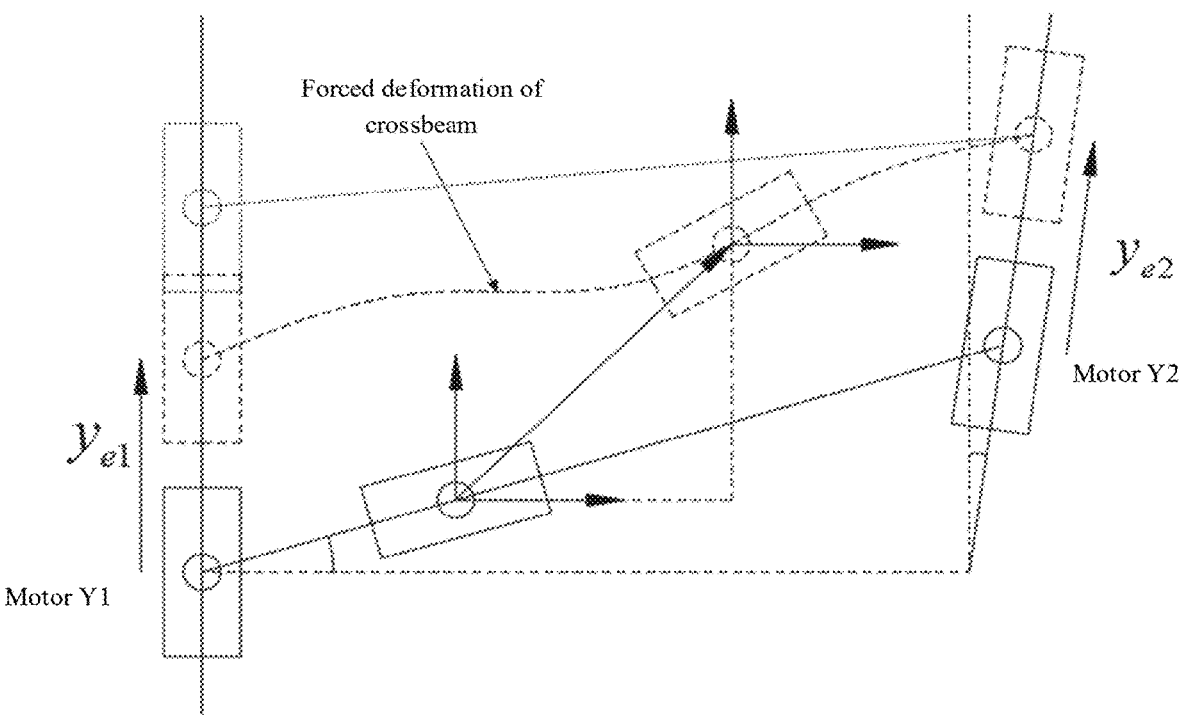
FIG. 1 is a schematic diagram of a forced crossbeam in existing pure position-synchronized control method.

In the drawings, 1 refers to crossbeam, 2 refers to first guide rail, 3 refers to second guide rail, 41 refers to first stator, 51 refers to second stator, 61 refers to third stator, and 7 refers to gantry platform.

DETAILED DESCRIPTION OF PREFERRED EMBODIMENTS

Embodiments of the invention are described in detail below, examples of which are shown in the accompanying drawings, where the same or similar reference numerals denote the same or similar elements or elements having the same or similar functions throughout. The embodiments described below with reference to the accompanying drawings are exemplary and are only intended to explain the invention, and shall not be construed as limiting the invention.

In the description of the invention, it should be understood that the terms "longitudinal", "transverse", "upper", "lower", "front", "back", "left", "right", "vertical", "horizontal", "top", "bottom" "inner", "outer" and the like indicate orientations or positional relationships based on those shown in the accompanying drawings, and are intended only for ease of description of the invention and for simplifying the description, and are not indicative of or suggestive of the need for the device or element referred to be constructed and operated in a particular orientation and, accordingly, are not to be construed as a limitation to the invention. Additionally, features prefixed with "first" or "second" may explicitly or implicitly include one or more such features, and are used solely to distinguish between similar features without implying any order or priority.

In the description of the invention, it should be noted that, unless otherwise expressly specified and defined, the terms "mounted," "connected" and "coupled" should be understood in a broad sense. For example, such connections may be fixed connections, removable connections, or integral connections, or they may be mechanical connections or electrical connections, or they may be direct connections or indirect connections through an intermediate medium, or they may be internal connections between two elements. For those skilled in the art, the specific meaning of the above terms in the context of the invention may be understood in specific cases.

In view of the problem of low positioning precision of the gantry platform caused by parallelism errors between the two guide rails and insufficient perpendicularity precision between the crossbeam and the guide rails, as well as the problem of complex gantry dual-drive system structure in prior art to address this issue, the invention proposes a gantry platform kinematics modeling method considering a parallelism error, which is described below with reference to FIGS. 2 and 3.

A gantry platform kinematics modeling method considering parallelism and perpendicularity errors applied to a gantry platform device, wherein the gantry platform device comprises a crossbeam 1, a first guide rail 2 and a second guide rail 3, one end of the crossbeam 1 is in sliding fit with the first guide rail 2, and the other end of the crossbeam 1 is in sliding fit with the second guide rail 3; the first guide rail 2 is provided with a first longitudinal motor, and the second guide rail 3 is provided with a second longitudinal motor, and the first longitudinal motor and the second longitudinal motor are respectively connected to two ends of the crossbeam 1; and the crossbeam 1 is provided with a transverse motor configured to drive the gantry platform 7 to move along the crossbeam 1.

The method comprises the following steps:

(1) establishing a two-dimensional coordinate system taking the first guide rail 2 as a reference guide rail and an initial position of the first longitudinal motor as an origin to establish a two-dimensional coordinate system $O_0$ in a plane at which the first guide rail 2 and the second guide rail 3 are located, wherein in the coordinate system, a coordinate of the first longitudinal motor after movement is Y1' $(0, y_1)$, a coordinate of the second longitudinal motor after movement is Y2' $(x_2, y_2)$, and a position coordinate of the gantry platform 7 after movement is $(x, y)$; and a length of the crossbeam 1 is 1, a parallelism error between the first guide rail 2 and the second guide rail 3 is α, and a perpendicularity error between the crossbeam 1 and the first guide rail 2 at the initial position of the first motor is $\beta_0$;

(2) constructing a forward kinematics solution model it is given that moved displacements of the first longitudinal motor, the second longitudinal motor and the transverse motor are $y_{e1}$, $y_{e2}$, $x_e$, and an initial offset of the transverse motor is $x_{z0}$, solving displacements $x_r$, $y_r$ of the gantry platform 7 as follows:

$$\begin{cases} x_r &= x_{e1} cos \beta_0 \\ y_r &= \dfrac{xy_2 - xy_1 + x_2 y_1}{x_2 - x_{z0}\beta_0} \end{cases} ; \qquad \text{equation } (1\text{-}4)$$

and (3) constructing an inverse kinematics solution model it is given that the displacements of the gantry platform 7 are $x_r$, $y_r$, solving required displacement $y_{e1}$, $y_{e2}$, $x_e$ for the first longitudinal motor, the second longitudinal motor and the transverse motor to move:

$$\begin{cases} y_{e1} &= y_1 \\ y_{e2} &= \dfrac{y_2 - 1\,\beta_0}{\cos a} \\ x_e &= \dfrac{x_r}{\cos \beta} \end{cases}, \qquad \text{equation } (1\text{-}9)$$

wherein β is a perpendicularity error after movement.

The aforementioned kinematics modeling method takes into account the parallelism error between the two guide rails as well as insufficient perpendicularity precision between the crossbeam 1 and the guide rails. By establishing forward and inverse kinematics solution models, a simple structure is provided for the gantry platform device while achieving more precise positioning for the gantry platform 7 and a better applicability to actual kinematic planning path of the gantry platform 7. This not only improves the positioning precision of the gantry platform 7 but also addresses issues of forced deformation and vibration of the crossbeam 1 caused by the parallelism errors between the guide rails and the perpendicularity errors between the crossbeam 1 and the guide rails, as well as insufficient positioning precision of the gantry platform 7.

It should be noted that the displacement of the gantry platform 7 is equivalent to the displacement of the manipulator on the gantry platform 7 in the coordinate system $O_0$.

Further, in the step (2), the step of constructing the forward kinematics solution model is as follows:

it is given that the moved displacements of the first longitudinal motor, the second longitudinal motor and the transverse motor are $y_{e1}$, $y_{e2}$, $x_e$ and the initial offset of the transverse motor is $x_{z0}$, coordinate values of each point are as follows:

$$x = x_{z0},\ y = x_{z0}\,\beta_0,\ +y_1 = y_{e1} \qquad \text{equation } (1\text{-}1)$$

$$x_2 = 1\cos\beta_0 + y_{e2}\,a,\ y_2 1\,\beta_0 + y_{e2}\cos a;$$

the perpendicularity error β after movement is:

$$\beta = \frac{y_2 - y_1}{x_2} = \frac{1\,\beta_0 + y_{e2}\cos a - y_{e1}}{1\cos\beta_0 + y_{e2}\,a}; \qquad \text{equation } (1\text{-}2)$$

an end position x after movement is:

$$X = X_{e1}\cos\beta_0 + x_{z0}; \qquad \text{equation } (1\text{-}3)$$

then a forward kinematics solution value $x_r$, $y_r$ is:

$$\begin{cases} x_r &= x_{e1} cos \beta_0 \\ y_r &= \dfrac{xy_2 - xy_1 + x_2 y_1}{x_2 - x_{z0}\beta_0} \end{cases}. \qquad \text{equation } (1\text{-}4)$$

Further, in the step (3), the step of constructing the inverse kinematics solution model is as follows:

it is given that the displacements of the gantry platform 7 are $x_r$, $y_r$, values of x, y, $x_2$ are:

$$x = x_{z0} + x_r,\ y = x_{z0}\,\beta_0 + y_r \qquad \text{equation } (1\text{-}5)$$

$$x_2 = 1\cos\beta_0 + y_r\,a;$$

based on a geometrical relationship, an equation set is obtained:

$$\begin{cases} \dfrac{-x}{x - x_2} = \dfrac{y_1 - y}{y - y_2} \\ x_2^2 + (y_2 - y_1)^2 = l^2 \end{cases}; \qquad \text{equation } (1\text{-}6)$$

values of the coordinate ($y_1$, $y_2$) are solved as follows:

$$\begin{cases} y_1 = -\dfrac{x_2 y - \dfrac{x\left(x_2 y - x\sqrt{(l-x_2)(l-x_2)} + x_2\sqrt{(l+x_2)(l-x_2)}\right)}{x_2}}{x - x_2} \\ y_2 = \dfrac{x_2 y - x\sqrt{(l+x_2)(l-x_2)} + x_2\sqrt{(l+x_2)(l-x_2)}}{x_2} \end{cases}; \qquad \text{equation } (1\text{-}7)$$

the perpendicularity error $\beta$ after movement is:

$$\beta = \frac{y_2 - y_1}{x_2}; \qquad \text{equation (1-8)}$$

the required displacements $y_{e1}$, $y_{e2}$, $x_e$ for the first longitudinal motor, the second longitudinal motor and the transverse motor to move are:

$$\begin{cases} y_{e1} = y_1 & \text{equation (1-9)} \\ y_{e2} = \dfrac{y_2 - l\beta_0}{\cos \alpha} \\ x_e = \dfrac{x_r}{\cos \beta} \end{cases}$$

It should be noted that, in the equation (1-5), the value of $x_2$ is an estimated value, which should be $x_2 = 1 \cos \beta_0 + y_{e2}$ $\alpha$. However, since $y_{e2}$ is unknown, by setting $y_{e2} \sim y_r$, computational complexity is reduced and computational speed is improved without affecting the positioning precision.

Accordingly, the invention further provides a gantry platform control method applied to the aforementioned gantry platform kinematics modeling method considering parallelism and perpendicularity errors.

The gantry platform control method comprises the following steps:

acquiring expected displacements x, y, of the gantry platform 7 after movement;

obtaining the required displacements $x_e$, $y_{e1}$, $y_{e2}$ for the transverse motor, the first longitudinal motor and the second longitudinal motor to move by using the inverse kinematics solution mode;

controlling the movement of the first longitudinal motor, the second longitudinal motor and the transverse motor;

acquiring an actual displacement $x_{t1}$, $y_{t1}$, $y_{t2}$ of the transverse motor, the first longitudinal motor and the second longitudinal motor;

obtaining an actual position (x, y) of the gantry platform 7 after movement by using the forward kinematics solution model; and compensating for a deviation between an expected position $(x_r, y_r)$ and the actual position (x, y) of the gantry platform 7 after movement.

This gantry platform control method applied to the aforementioned gantry platform 7 kinematics modeling method considering parallelism and perpendicularity errors obtains, by using the inverse kinematics solution model, the required positions for the three motors to move under control, and acquires the actual positions of the three motors after movement, and then obtains, by using the forward kinematics solution model, the actual position of gantry platform 7 after movement, and takes the actual position as feedback to compensate the deviation, thus significantly improving the positioning precision of the gantry platform 7.

Specifically, the actual displacement $x_{t1}$, $y_{t1}$, $y_{t2}$ of the transverse motor, the first longitudinal motor and the second longitudinal motor is acquired by using a displacement sensor. For example, the displacement sensor is a linear grating ruler with high detection precision. It is to be understood that the parallelism error $\alpha$ and perpendicularity error $\beta_0$ are obtained by means of measurement, for example, by means of laser measurement.

Accordingly, the invention further provides a gantry platform device applied to the aforementioned gantry platform control method, wherein the gantry platform device comprises a crossbeam 1, a first guide rail 2 and a second guide rail 3, one end of the crossbeam 1 is in sliding fit with the first guide rail 2, and the other end of the crossbeam 1 is in sliding fit with the second guide rail 3; the first guide rail 2 is provided with a first longitudinal motor, the second guide rail 3 is provided with a second longitudinal motor, and the first longitudinal motor and the second longitudinal motor are respectively connected to two ends of the crossbeam 1; and the crossbeam 1 is provided with a transverse motor configured to drive the gantry platform 7 to move along the crossbeam 1.

The gantry platform device further comprises a controller and a displacement sensor, the displacement sensor is configured to sense the displacements of the transverse motor, the first longitudinal motor and the second longitudinal motor, and send displacement data to the controller.

The controller stores the forward kinematics solution model and the inverse kinematics solution model, the controller is configured to obtain the required displacements $x_e$, $y_{e1}$, $y_{e2}$ for the transverse motor, the first longitudinal motor and the second longitudinal motor to move based on the expected displacement of the gantry platform 7 after movement and the inverse kinematics solution model, send a movement instruction to the transverse motor, the first longitudinal motor and the second longitudinal motor, and obtain a compensation deviation.

It is to be understood that the controller includes a feedback controller and an end-trajectory feedback controller, with each of the transverse motor, first longitudinal motor, and second longitudinal motor corresponding to a feedback controller. The end-trajectory feedback controller is configured to obtain a required displacement $x_e$, $y_{e1}$, $y_{e2}$ for the transverse motor, the first longitudinal motor and the second longitudinal motor to move based on the expected displacement of the gantry platform 7 after movement and the inverse kinematics solution model. The feedback controller is configured to receive a displacement signal from the displacement sensor, and is further configured to receive a control signal sent by the end trajectory feedback controller and send a control command to the motor.

Figure 2:
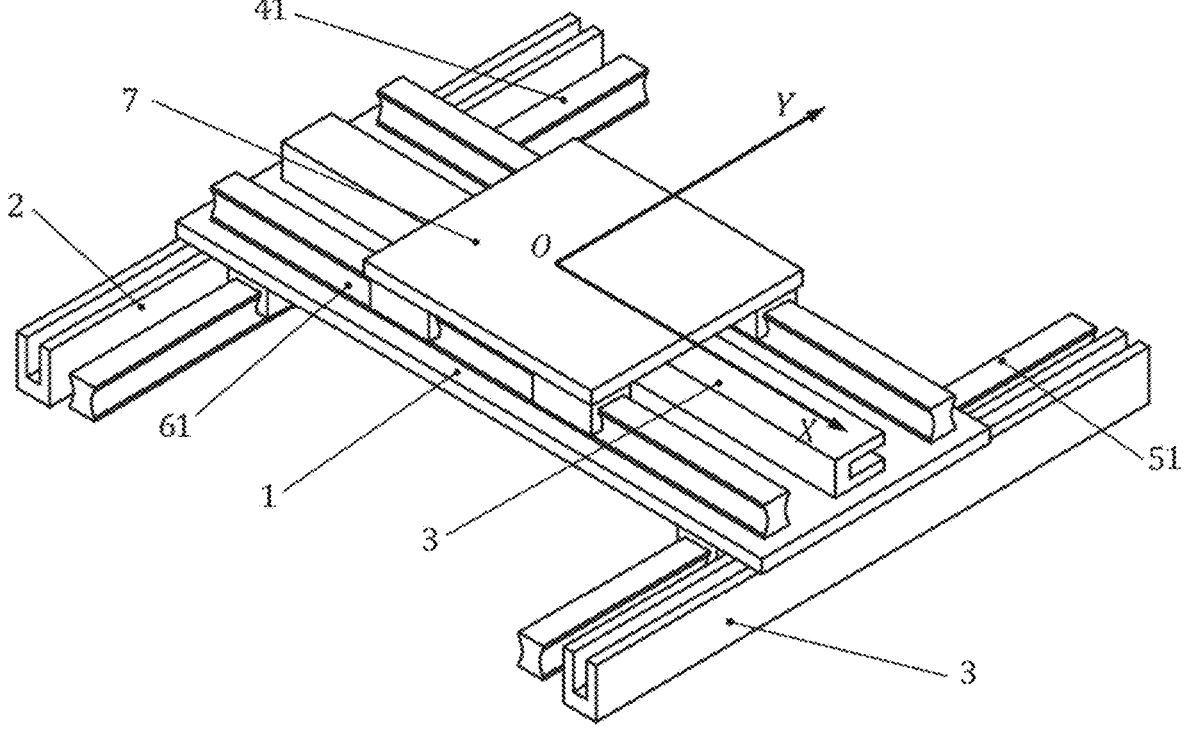
FIG. 2 is a schematic diagram of a gantry platform device of the invention.
Figure 3:
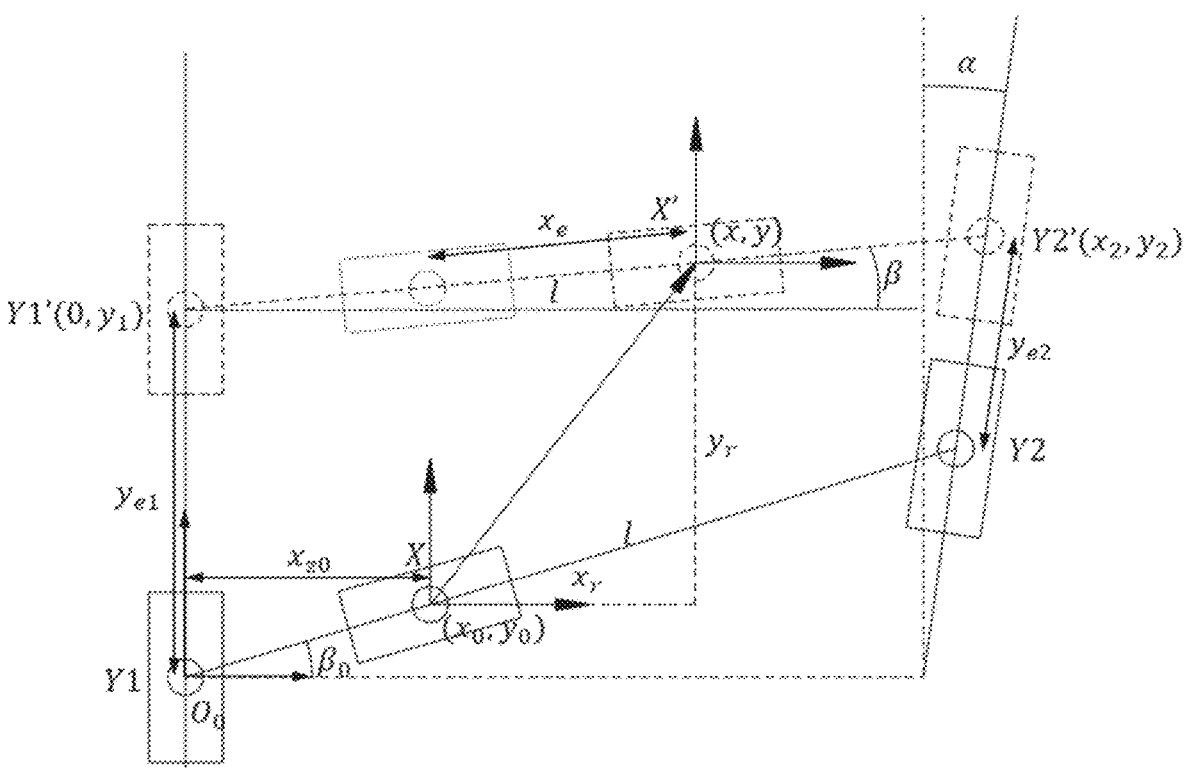
FIG. 3 is a schematic diagram of the motion of a gantry platform considering parallelism and perpendicularity errors.

Referring to FIG. 2, in one embodiment of the gantry platform device of the invention, the transverse motor, the first longitudinal motor, and the second longitudinal motor are all linear motors. The first stator 41 of the first longitudinal motor is parallel to the first guide rail 2, the second stator 51 of the second longitudinal motor is parallel to the second guide rail 3, the two ends of the crossbeam 1 are respectively connected to the first rotor and the second rotor, the third stator 61 of the transverse motor is fixed on the crossbeam 1, and the third rotor is connected to the gantry platform. Since there is a certain clearance between the stator and rotor that base on the linear motor to allow the rotor to move smoothly, the presence of parallelism and perpendicularity errors does not affect the normal operation of the three motors. The adoption of linear motors as driving parts simplifies the structure of the gantry platform device, making it lightweight and more suitable for the processing of precision components.

Figure 4:
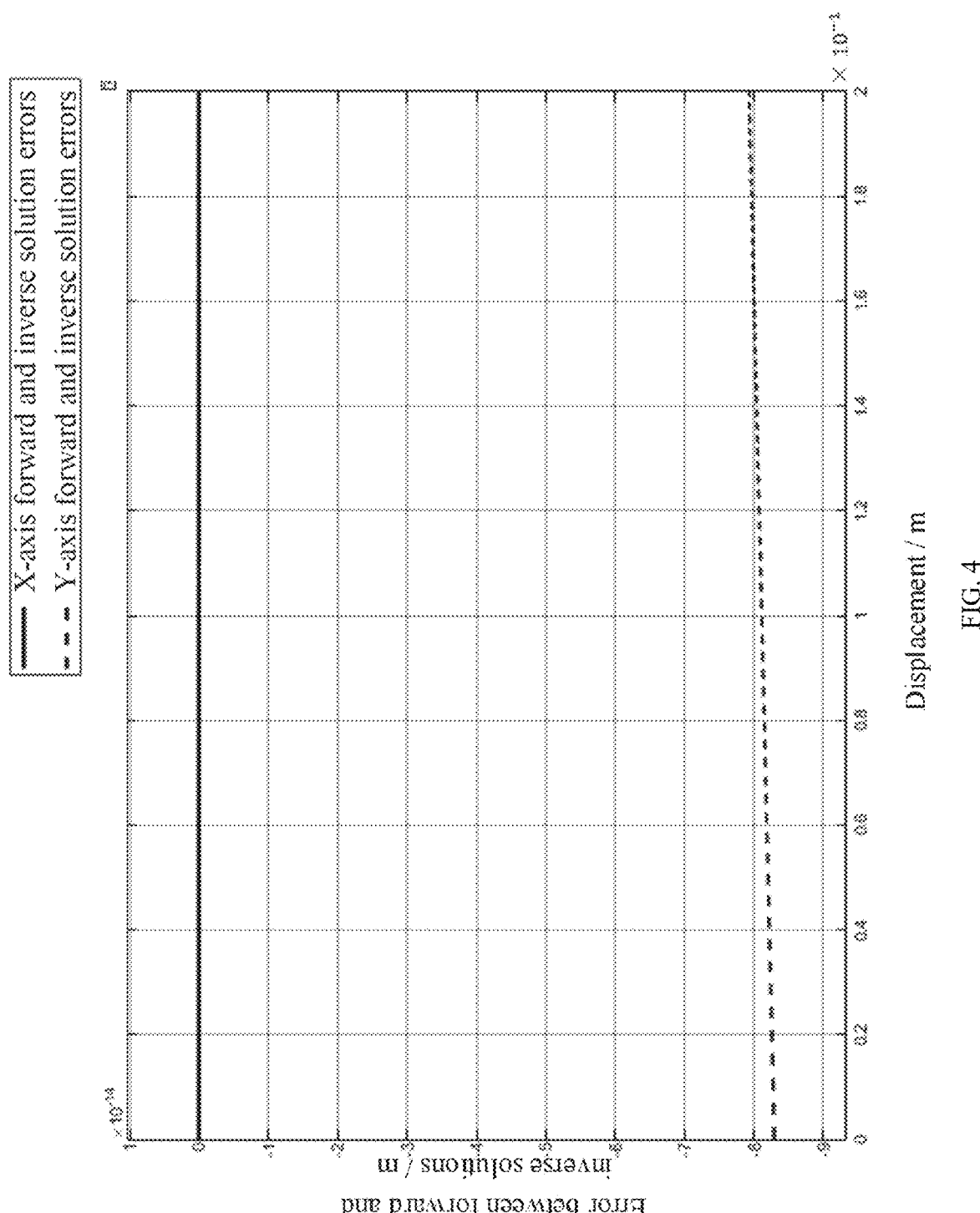
FIG. 4 is a result diagram of a simulation experiment of the invention.

Based on the aforementioned gantry platform control method and gantry platform device, simulation experiments were conducted. When the displacement $x_r$, $y_r$ of the gantry platform 7 is set to 0.2 m, the theoretical error between the forward kinematics solution and the inverse kinematics solution should be equal to 0. However, in equation (1-5), an estimation is performed for $y_{e2}$, resulting in an error of $8 \times 10^{-14}$ m as shown in FIG. 4. This value is far smaller than the noise level of the actual motion. Therefore, this estimation does not affect the precision of the proposed forward and inverse kinematics solutions.

Figure 5:
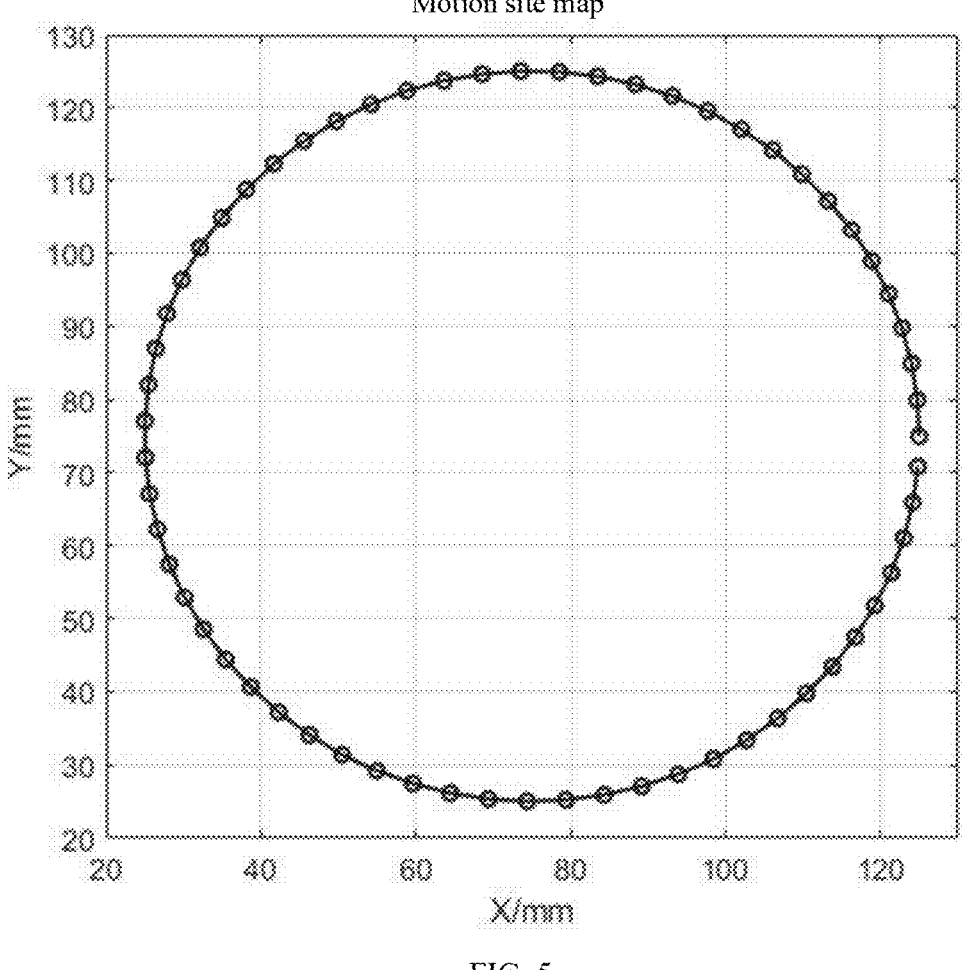
FIG. 5 is a motion site map of a gantry platform manipulator in a coordinate system $O_0$ during positioning experiment.

The gantry platform control method of the invention was compared with the existing pure position-synchronized control method through a positioning experiment. FIG. 5 is a motion site map of the end of the manipulator installed on the gantry platform 7 in the positioning experiment within the coordinate system $O_0$. The motion trajectory is a circle with a diameter of 100 mm, and there are a total of 63 positioning points in the trajectory. The end positioning precision is measured by using a laser interferometer. Steps of existing pure position-synchronized control method are as follows: an expected displacement of a first longitudinal motor after movement is $y_r$, that is, a required displacement that the first longitudinal motor needs to move is $y_r$; the first longitudinal motor synchronously moves with a second longitudinal motor to obtain an actual position $y_{t1}$ of the first longitudinal motor after movement, where $y_{t1}$ is used as a target motion displacement for the second longitudinal motor; and an expected displacement $x_r$ of a transverse motor is used as a target motion displacement for the transverse motor.

Figure 6:
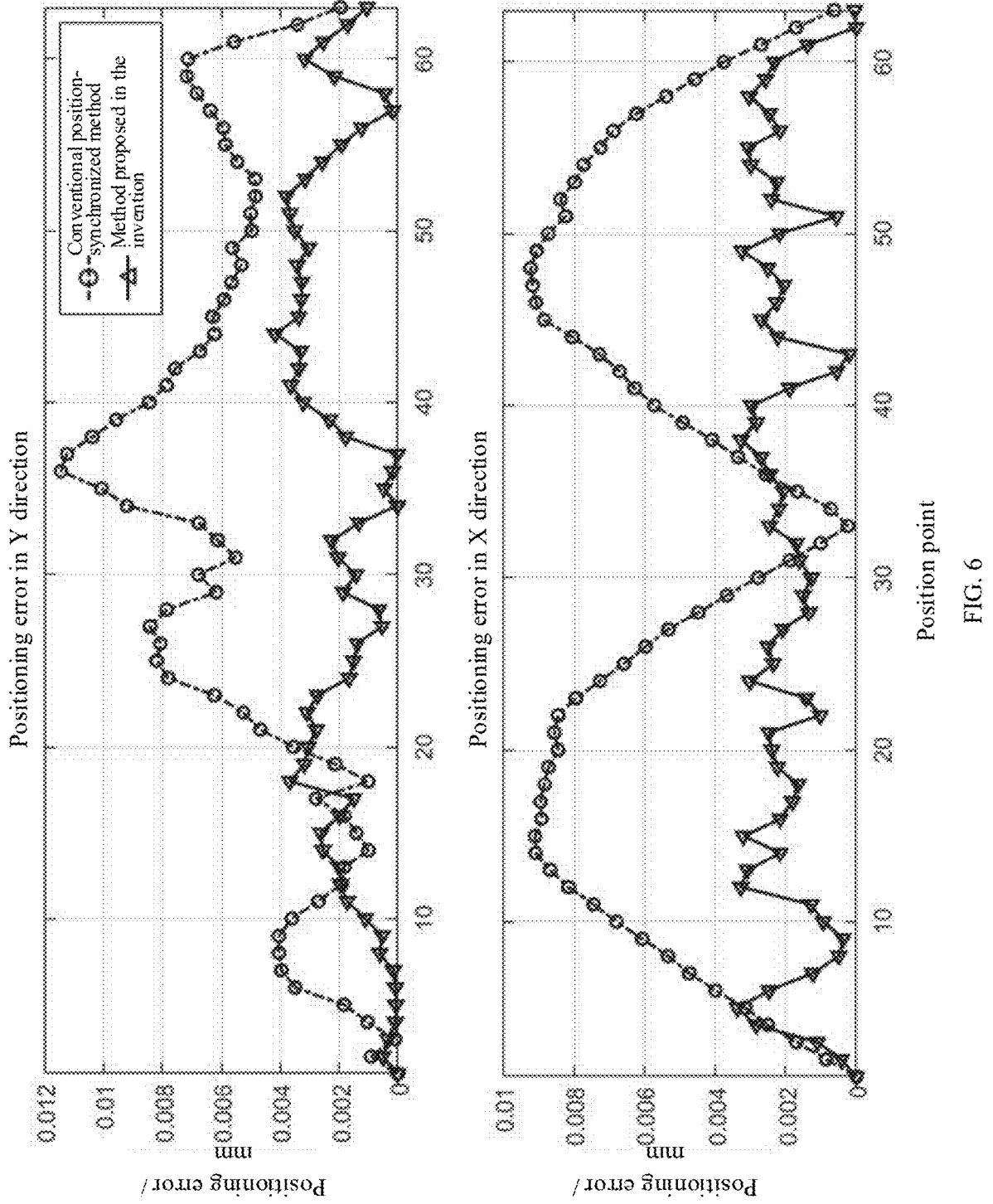
FIG. 6 is a result diagram of the positioning experiment.

The positioning experiment results are shown in FIG. 6. The maximum positioning error in the XY direction for existing pure position-synchronized control methods is around 10 μm, while the maximum positioning error in the invention is reduced to below 4 μm, indicating that the invention achieves a significant improvement in positioning precision compared to existing pure position-synchronized method.

Other configurations and operations of the gantry platform kinematics modeling method considering parallelism and perpendicularity errors according to an embodiment of the invention are known to those of ordinary skill in the art, and thus will not be described in detail herein.

Reference in the description of this specification to "embodiment," "example" and other such descriptions means that a particular feature, structure, material or characteristic described in connection with the embodiment or example is included in at least one embodiment or example of the invention. In this specification, the illustrative descriptions of the above terms do not necessarily refer to the same embodiment or example. Furthermore, the particular feature, structure, material or characteristic described may be combined in any suitable manner in one or more embodiments or examples.

While embodiments of the invention have been shown and described, those skilled in the art will understand that numerous changes, modifications, variations, and alterations may be made to these embodiments without departing from the principle and essence of the invention. The scope of the invention is defined by the claims and their equivalents.

We claim:

1. A gantry platform control method applied to a gantry platform device which comprises a crossbeam, a first guide rail and a second guide rail, wherein one end of the crossbeam is in sliding fit with the first guide rail, and the other end of the crossbeam is in sliding fit with the second guide rail; the first guide rail is provided with a first longitudinal motor, the second guide rail is provided with a second longitudinal motor, and the first longitudinal motor and the second longitudinal motor are respectively connected to two ends of the crossbeam; and the crossbeam is provided with a transverse motor configured to drive the gantry platform to move along the crossbeam; and a gantry platform kinematics modeling method considering parallelism and perpendicularity errors comprises the following steps:

(1) establishing a two-dimensional coordinate system taking the first guide rail as a reference guide rail and an initial position of the first longitudinal motor as an origin to establish a two-dimensional coordinate system $O_0$ in a plane at which the first guide rail and the second guide rail are located, wherein in the coordinate system, a coordinate of the first longitudinal motor after movement is Y1' $(0, y_1)$, a coordinate of the second longitudinal motor after movement is Y2' $(x_2, y_2)$, and a position coordinate of the gantry platform after movement is $(x, y)$; and a length of the crossbeam is 1, a parallelism error between the first guide rail and the second guide rail is $\alpha$, and a perpendicularity error between the crossbeam and the first guide rail at the initial position of the first motor is $\beta_0$;

(2) constructing a forward kinematics solution model it is given that moved displacements of the first longitudinal motor, the second longitudinal motor and the transverse motor are $y_{e1}$, $y_{e2}$, $x_e$, and an initial offset of the transverse motor is $x_{z0}$, solving displacements $x_r$, $y_r$ of the gantry platform as follows:

$$\begin{cases} x_r = x_{e1} \cos \beta_0 & \text{equation } (1\text{-}4) \\ y_r = \dfrac{xy_2 - xy_1 + x_2 y_1}{x_2 - x_{z0}\beta_0} \; ; \end{cases}$$

and (3) constructing an inverse kinematics solution model it is given that the displacements of the gantry platform are $x_r$, $y_r$, solving required displacements $y_{e1}$, $y_{e2}$, $x_e$ for the first longitudinal motor, the second longitudinal motor and the transverse motor to move:

$$\begin{cases} y_{e1} = y_1 & \text{equation } (1\text{-}9) \\ y_{e2} = \dfrac{y_2 - l\beta_0}{\cos \alpha} \;, \\ x_e = \dfrac{x_r}{\cos \beta} \end{cases}$$

wherein $\beta$ is a perpendicularity error after movement;

wherein the gantry platform control method comprises the following steps:

acquiring expected displacements $x_r$, $y_r$ of the gantry platform after movement;

obtaining the required displacements $x_e$, $y_{e1}$, $y_{e2}$ for the transverse motor, the first longitudinal motor and the second longitudinal motor to move by using the inverse kinematics solution mode;

controlling the movement of the first longitudinal motor, the second longitudinal motor and the transverse motor;

acquiring actual displacements $x_{t1}$, $y_{t1}$, $y_{t2}$ of the transverse motor, the first longitudinal motor and the second longitudinal motor;

obtaining an actual position (x, y) of the gantry platform after movement by using the forward kinematics solution model; and compensating for a deviation between an expected position ($x_r$, $y_r$) and the actual position (x, y) of the gantry platform after movement.

2. The method according to claim 1, wherein, in the step (2), the step of constructing the forward kinematics solution model is as follows:

it is given that the moved displacements of the first longitudinal motor, the second longitudinal motor and the transverse motor are $y_{e1}$, $y_{e2}$, $x_e$, and the initial offset of the transverse motor is $x_{z0}$, coordinate values of each point are as follows:

$$x_0 = x_{z0}, \quad y_0 = x_{z0}\beta_0, \quad y_1 = y_{e1}; \qquad \text{equation } (1\text{--}1)$$
$$x_2 = l \cos\beta_0 + y_{e2}\alpha, \quad y_2 = l\beta_0 + y_{e2}\cos\alpha;$$

the perpendicularity error $\beta$ after movement is:

$$\beta = \frac{y_2 - y_1}{x_2} = \frac{l\beta_0 + y_{e2}\cos\alpha - y_{e1}}{l\cos\beta_0 + y_{e2}\alpha}; \qquad \text{equation } (1\text{--}2)$$

an end position x after movement is:

$$x = x_{e1}\cos\beta_0 + x_{z0}; \qquad \text{equation } (1\text{--}3)$$

then a forward kinematics solution value $x_r$, $y_r$ is:

$$\begin{cases} x_r = x_{e1}\cos\beta_0 \\ y_r = \dfrac{xy_2 - xy_1 + x_2 y_1}{x_2 - x_{z0}\beta_0} \end{cases}. \qquad \text{equation } (1\text{--}4)$$

3. The method according to claim 1, wherein, in the step (3), the step of constructing the forward kinematics solution model is as follows:

it is given that the displacements of the gantry platform are $x_r$, $y_r$, values of x, y, $x_2$ are:

$$x = x_{z0} + x_r, \quad y_0 = x_{z0}\beta_0 + y_r; \qquad \text{equation } (1\text{--}5)$$
$$x_2 = l\cos\beta_0 + y_r\alpha;$$

based on a geometrical relationship, an equation set is obtained:

$$\begin{cases} \dfrac{-x}{x - x_2} = \dfrac{y_1 - y}{y - y_2} \\ x_2^2 + (y_2 - y_1)^2 = l^2 \end{cases}; \qquad \text{equation } (1\text{--}6)$$

values of the coordinate ($y_1$, $y_2$) are solved as follows:

$$\begin{cases} y_1 = -\dfrac{x_2 y - \dfrac{x\left(x_2 y - x\sqrt{(l - x_2)(l - x_2)} + x_2\sqrt{(l + x_2)(l - x_2)}\right)}{x_2}}{x - x_2} \\ y_2 = \dfrac{x_2 y - x\sqrt{(l + x_2)(l - x_2)} + x_2\sqrt{(l + x_2)(l - x_2)}}{x_2} \end{cases}; \qquad \text{equation } (1\text{--}7)$$

the perpendicularity error $\beta$ after movement is:

$$\beta = \frac{y_2 - y_1}{x_2}; \qquad \text{equation } (1\text{--}8)$$

the required displacements $y_{e1}$, $y_{e2}$, $x_e$ for the first longitudinal motor, the second longitudinal motor and the transverse motor to move are:

$$\begin{cases} y_{e1} = y_1 \\ y_{e2} = \dfrac{y_2 - l\beta_0}{\cos\alpha} \\ x_e = \dfrac{x_r}{\cos\beta} \end{cases}. \qquad \text{equation } (1\text{--}9)$$

4. The method according to claim 3, wherein, in the equation (1-5), the value of $x_2$ is an estimated value, and $y_{e2}{\sim}y_r$ is set.

5. The gantry platform control method according to claim 1, wherein actual displacements $x_{t1}$, $y_{t1}$, $y_{t2}$ of the transverse motor, the first longitudinal motor and the second longitudinal motor are acquired by using a displacement sensor.

6. The gantry platform control method according to claim 1, wherein the parallelism error a and the perpendicularity error $\beta_0$ are obtained by means of measurement.

7. A gantry platform device applied to the gantry platform control method according to claim 1, wherein the gantry platform device further comprises a controller and a displacement sensor, the displacement sensor is configured to sense the displacements of the transverse motor, the first longitudinal motor and the second longitudinal motor, and send displacement data to the controller;

the controller stores the forward kinematics solution model and the inverse kinematics solution model, the controller is configured to obtain the required displacements $y_{e1}$, $y_{e2}$, $x_e$ for the first longitudinal motor, the second longitudinal motor and the transverse motor to move based on the expected displacement of the gantry platform after movement and the inverse kinematics solution model, send a movement instruction to the transverse motor, the first longitudinal motor and the second longitudinal motor, and obtain a compensation deviation.

* * * * *